US010051844B2

(12) United States Patent
Newell (10) Patent No.: US 10,051,844 B2
(45) Date of Patent: Aug. 21, 2018

(54) MODULAR SUBMERSIBLE AQUACULTURE RAFT

(71) Applicant: Carter Newell, Damariscotta, ME (US)

(72) Inventor: Carter Newell, Damariscotta, ME (US)

( * ) Notice: Subject to any disclaimer, the term of this patent is extended or adjusted under 35 U.S.C. 154(b) by 587 days.

(21) Appl. No.: 14/765,014

(22) PCT Filed: Mar. 30, 2015

(86) PCT No.: PCT/US2015/023252
§ 371 (c)(1),
(2) Date: Jul. 31, 2015

(87) PCT Pub. No.: WO2015/153405
PCT Pub. Date: Oct. 8, 2015

(65) Prior Publication Data
US 2016/0286767 A1    Oct. 6, 2016

(51) Int. Cl.
| | |
|---|---|
| *A01K 61/00* | (2017.01) |
| *A01K 61/60* | (2017.01) |
| *A01G 31/02* | (2006.01) |
| *B63B 35/00* | (2006.01) |
| *B63B 35/34* | (2006.01) |
| *B63G 8/22* | (2006.01) |
| *A01K 61/54* | (2017.01) |

(52) U.S. Cl.
CPC .............. *A01K 61/60* (2017.01); *A01G 31/02* (2013.01); *A01K 61/54* (2017.01); *B63B 35/00* (2013.01); *B63B 35/34* (2013.01); *B63G 8/22* (2013.01); *Y02P 60/642* (2015.11)

(58) Field of Classification Search
CPC ........ A01K 61/60; A01K 61/54; A01K 61/90; B63B 35/00; B63B 35/34
USPC ....... 119/223, 240, 215, 239, 200, 208, 221, 119/238, 241, 213, 201, 207, 234; 114/266, 267
See application file for complete search history.

(56) References Cited

U.S. PATENT DOCUMENTS

| | | | | |
|---|---|---|---|---|
| 4,615,301 A | * | 10/1986 | Maekawa | A01K 61/60 119/223 |
| 4,876,985 A | * | 10/1989 | Marcum | A01K 61/54 119/240 |
| 5,273,473 A | * | 12/1993 | Allen | B63B 7/06 114/219 |
| 5,299,530 A | * | 4/1994 | Mukadam | A01K 61/60 119/223 |
| 5,655,938 A | * | 8/1997 | Huguenin | A01K 61/60 441/29 |
| 5,823,132 A | * | 10/1998 | Donavon | B63B 17/04 114/266 |

(Continued)

*Primary Examiner* — Yvonne R Abbott-Lewis
(74) *Attorney, Agent, or Firm* — Jeffrey Joyce; Patricia Mathers (57) ABSTRACT

A submersible raft device that is primarily used for aquaculture farming. The raft device has a raft surface, a buoyance support structure, and a submersion control system. The buoyance support structure and the submersion control system allow the raft to be submerged to a desired depth beneath the ocean surface. When used for certain kinds of aquaculture farming, such as mussel farming, submerging the raft below the surface protects the raft, as well as the mussels growing on ropes suspended from the raft, from damage in times of hazardous sea conditions.

13 Claims, 8 Drawing Sheets

(56) References Cited

U.S. PATENT DOCUMENTS

| | | | | |
|---|---|---|---|---|
| 6,044,798 | A * | 4/2000 | Foster | A01K 61/54 |
| | | | | 119/240 |
| 6,286,460 | B1 * | 9/2001 | Gudbjornsson | A01K 61/90 |
| | | | | 119/200 |
| 6,481,378 | B1 * | 11/2002 | Zemach | A01K 61/60 |
| | | | | 119/223 |
| 6,520,115 | B2 * | 2/2003 | Boyd | A01K 61/60 |
| | | | | 119/223 |
| 6,892,672 | B2 * | 5/2005 | Klein | A01K 61/60 |
| | | | | 114/123 |
| 7,661,389 | B2 * | 2/2010 | Tuerk | A01K 61/60 |
| | | | | 119/223 |
| 9,278,731 | B1 * | 3/2016 | Canela | B63B 7/08 |
| 2010/0287829 | A1 * | 11/2010 | Bussell | A01G 33/00 |
| | | | | 47/1.4 |
| 2017/0013809 | A1 * | 1/2017 | Heasman | A01K 61/54 |
| 2017/0027136 | A1 * | 2/2017 | Newell | A01G 31/02 |

* cited by examiner

MODULAR SUBMERSIBLE AQUACULTURE RAFT

BACKGROUND INFORMATION

Field of the Invention

The invention relates to the field of aquaculture farming. More particularly, the invention relates to a raft used for aquaculture farming.

Discussion of the Prior Art

Aquaculture farming, mariculture, or aquafarming, is the farming of aquatic organisms, such as oysters and mussels. Much of this farming occurs in open bodies of water where there are inherent difficulties from harsh weather and sea conditions.

What is needed is a submersible aquafarming raft that can be submerged in times of extreme weather or drift ice.

BRIEF SUMMARY OF THE INVENTION

The invention is a submersible raft that may be used for aquaculture farming. The discussion of the submersible raft may hereinafter refer to a device that is used in aquaculture farming, and more specifically, mussel farming, but it is understood that the submersible raft may also be used for other purposes.

The submersible raft according to the invention is an apparatus that is well-suited for use in aquaculture in ocean waters. Depending on the prevailing weather conditions, the raft is held in the water so that a raft surface is at or near the surface of the water, or is submerged below the surface.

The submersible raft has a buoyancy support structure and a submersion control system that together allow the raft to be held selectively at or near the surface level of the water or submerged to a pre-determined depth. The buoyancy support structure includes a number of pontoons that are coupled to each other by a plurality of pontoon ties so as to form a flat support system for the raft surface. The raft surface is conventional, in that it is formed of surface elements, such as a plurality of planks, steel members, or timbers, or sheets of some suitable material, laid out across the buoyancy support structure. Ropes are attached to the surface elements and hang down below the raft surface.

The submersion control system includes air and water control devices that allow the weight of the raft to be changed, in order to achieve a desired level of buoyancy. The pontoons are floodable with water, thereby increasing the weight of the structure and forcing it below the surface of the water. The amount of air and water in the pontoons is controllable, so that the raft may be submerged to a specific depth below the surface. The control system also includes one or more airbags in each pontoon which are inflatable or deflatable by means of an air hose.

The intended use of the raft according to the invention is as an aquaculture farm, for example, to grow mussels, oysters, etc. The aquatic cultures attach to the ropes or containers that are suspended from the raft surface. These aquaculture farms are typically in ocean waters and the rafts used are therefore exposed to the elements of the weather.

Rough seas, ice, etc., can cause damage to the rafts and cause the aquatic cultures to fall from the ropes, particularly when the raft is at the surface of the water. Submerging the raft below the surface is an effective way to prevent crashing waves or ice from damaging the rafts. Depending on the particular weather that is forecast, the raft according to the invention may be submerged to the appropriate and desired depth.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
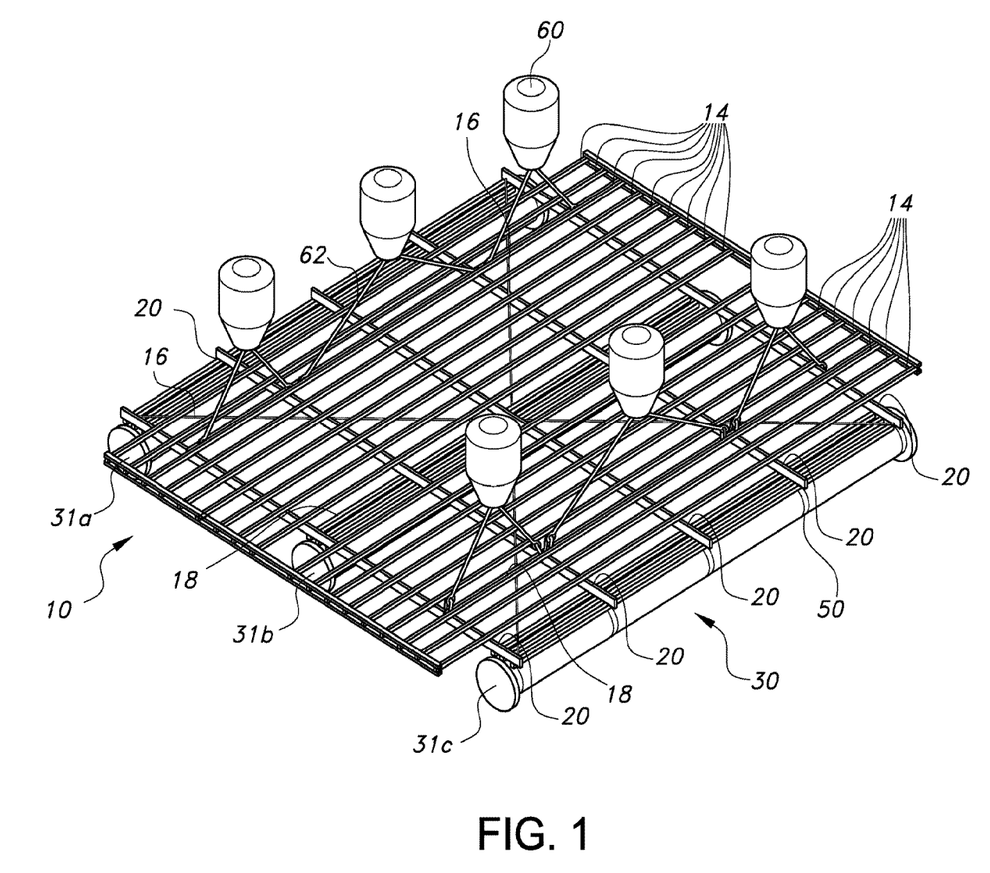
FIG. 1 is a top perspective view of the device according to the invention.
Figure 2:
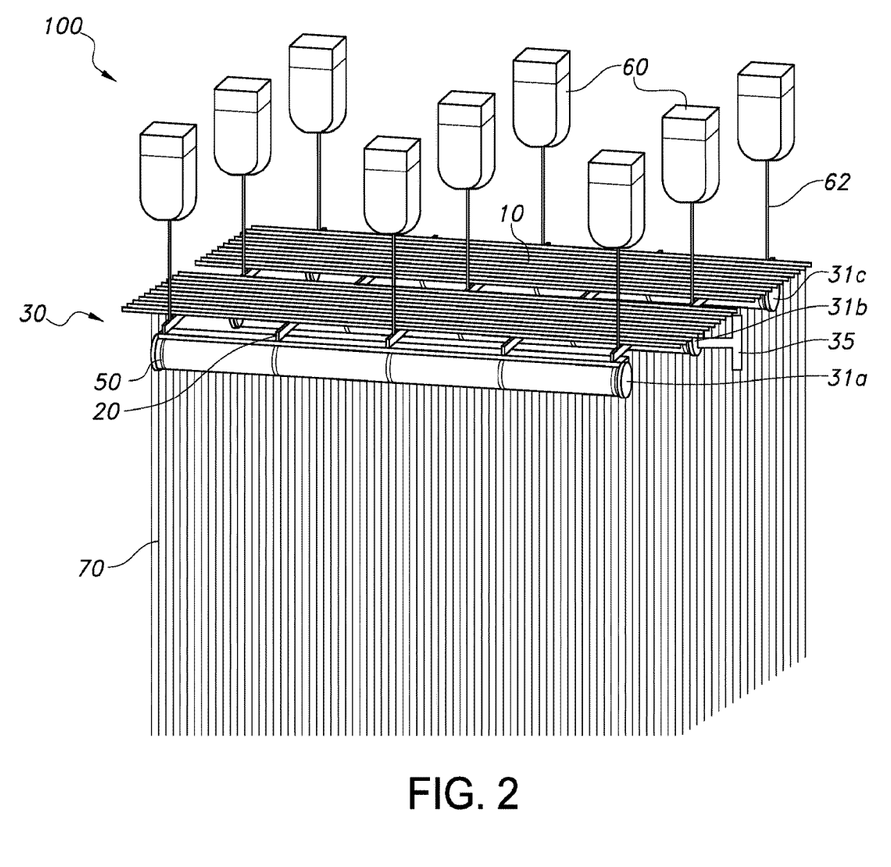
FIG. 2 is a perspective view of the device, showing aquatic culture ropes suspended beneath the raft.
Figure 3:
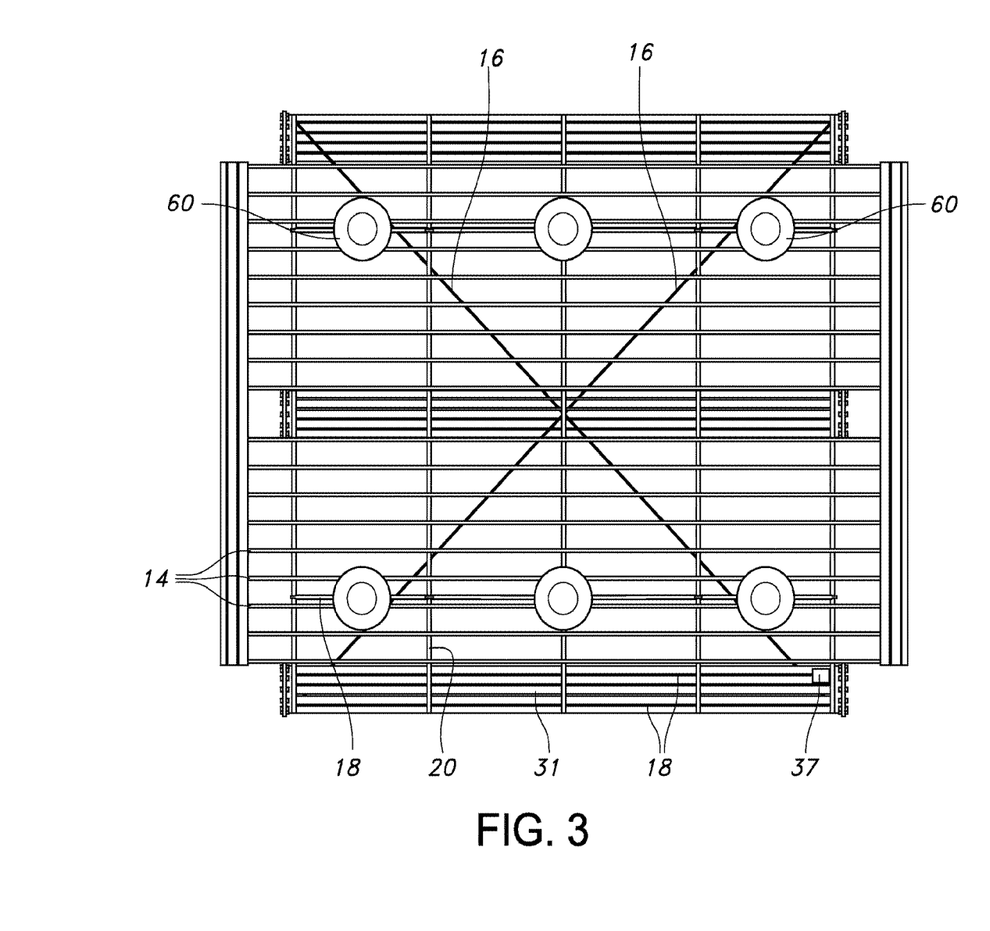
FIG. 3 is a top plan view of the surface of the raft, showing the raft surface and the float devices.
Figure 4:
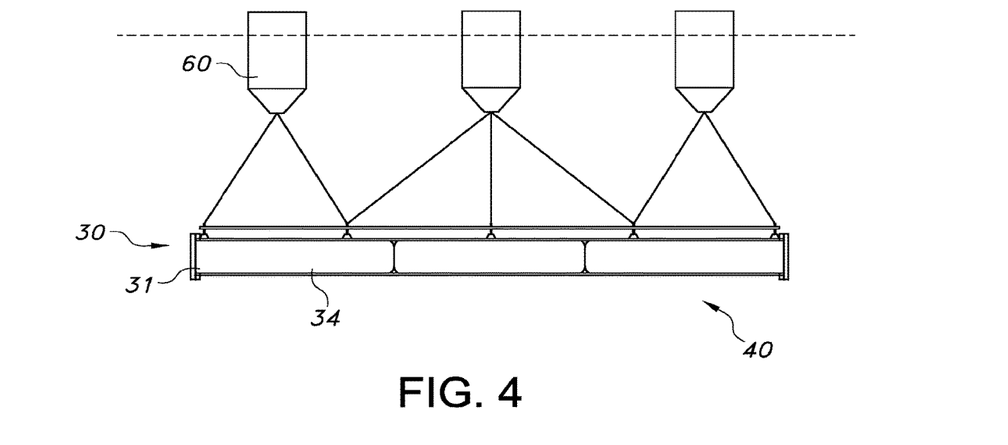
FIG. 4 is a side elevation view of the floats and a single pontoon, showing multiple air bladders
Figure 5:
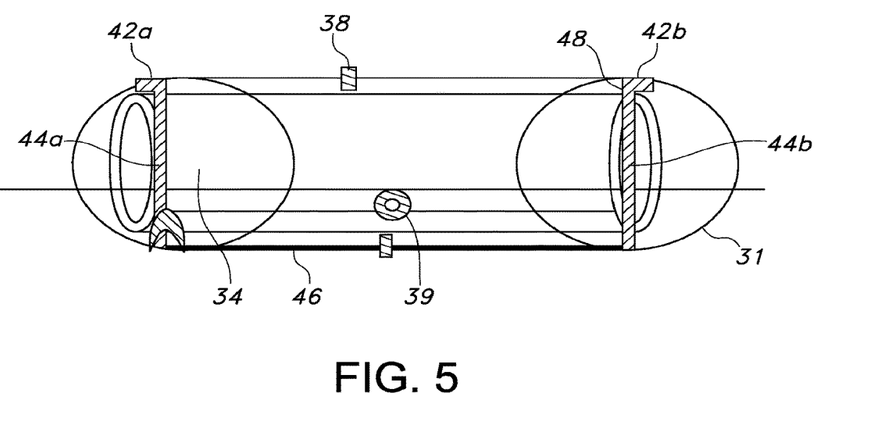
FIG. 5 is a schematic diagram of a pontoon, showing the elements of the submersion control system.
Figure 6:
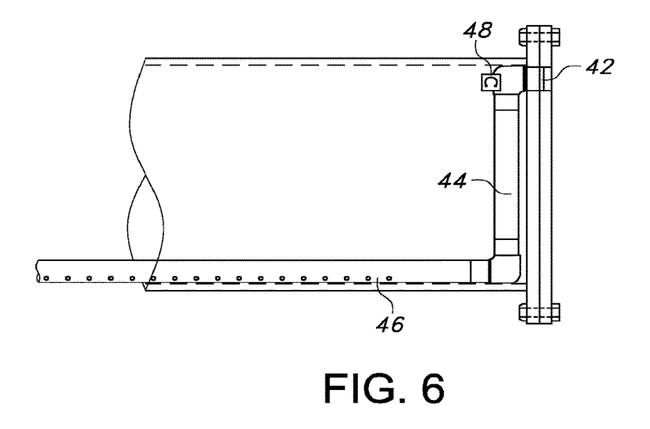
FIG. 6 is a side view of a portion of the pontoon submersion control system.

FIGS. 1, 2 and 3 illustrate a submersible raft 100 according to the invention that comprises a raft surface 10 that is supported on a buoyancy support structure 30. A submersion control system 40 that cooperates with the buoyancy support structure 30 to control the weight of the buoyancy support structure is shown in FIGS. 5 and 6. The raft surface 10 is conventional, in that it is formed of surface elements, such as a plurality of planks, steel members, or timbers, or sheets of some suitable material, laid out across the buoyancy support structure 30. Ropes 70 are attached to the surface elements and hang down below the raft surface. Aquatic cultures, such as seed mussels, attach to the ropes 70. The buoyancy support structure 30 provides the desired buoyancy, either keeping the raft 100 at or near the surface of the water or at a specified depth. The submersion control system 40 controls the amount of fluid that enters or exits the buoyancy support structure 30, thereby controlling the weight and therefore the depth of the raft 100 in the water. The raft 100 is submerged during the winter, when rough seas are in the weather forecast, such as, for example, storms, hurricanes, periods of sea ice, and during other weather or sea conditions which could potentially cause damage to the raft 100 or the aquatic cultures.

FIGS. 1, 2, 3 and 4 show the buoyancy support structure 30, which includes a plurality of pontoons 31/31A, 31B, 31C, etc. that are coupled to each other by a plurality of pontoon ties or connectors 20. In the embodiment shown, three pontoons 31 are coupled together with the ties 20 to form the support structure 30, but it is understood that, depending on the size of the particular raft 100, different numbers of pontoons may be used.

Figure 10:
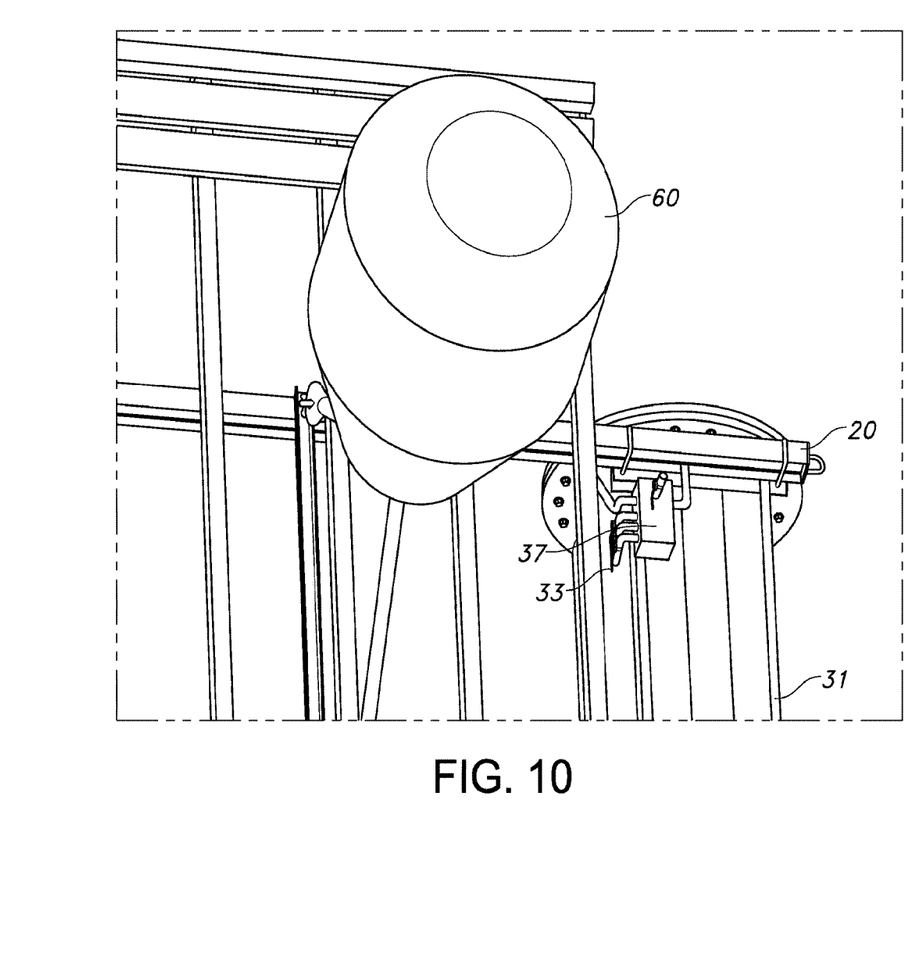
FIG. 10 is a top view of the raft, illustrating an air hose manifold attached to the surface of the raft.

FIGS. 5 and 6 illustrate details of the submersion control system 40, which is used to control the buoyancy depth of the raft 100. At least one each of an air bladder 34, an inlet/outlet valve 38, and a one one-way inlet valve 39 are provided in each pontoon 31. The inlet/outlet valve 38 is connectable to an air hose (not shown) to pump air into or out of the air bladder 34, and the one-way inlet valve 39 is used to allow water into the pontoon 31. The air hose extends from the inlet/outlet valve 38 and connects to an air hose manifold 37, shown in FIGS. 2, 3, and 10 from which the air hose extends to the surface where air is pumped in or let out of the air bladder 34. At least one one-way outlet valve 42 is provided on each pontoon 31, to allow water and air to exit the pontoon. The embodiment shown contains two one-way outlet valves 42A, 42B, one on each end of the pontoon 31. The air/water outlet valves 42A, 42B are connected to conduits 44/44A, 44B, that are connected to a perforated tube 46 that extends between the two conduits 44A, 44B. When the airbladder 34 is inflated, the water inside of the pontoon 31 is forced into the perforated tube 46 and then through the conduits 44A, 44B and out through the respective air/water outlet valve 42A, 42B. When water floods the pontoon 31 via the water inlet valve 39, air in the pontoon 31 is forced into the perforated tube 46 through the conduits 44A, 44B and out of the pontoon 31 through the air/water outlet valves 42A, 42B. In addition, one or more small holes 48, individually designated 48A, 48B, etc., are provided near the top of the conduits 44A, 44B to allow air to exit the pontoon 31 through the air/water outlet valves 42A, 42B. Air in the air bladder 34 is forced out through the air inlet/outlet 38 and exits through the air hose.

Referring again to FIGS. 1 and 2, floats 60 are attached to the submersible raft 100 when it is submerged. The float devices 60 are connected to the raft surface 10 by float lines 62 in a manner that distributes the weight of the raft across the float devices 60. The float devices 60 prevent the raft 100 from sinking below the desired depth in the event that the air to water ratio in the buoyance control system 30 cannot be set at a level that maintains the desired depth. The float devices 60 also provide additional buoyancy to support the raft 100 as the bivalves grow and additional weight is added to the raft 100.

In normal operating conditions, the raft 100 is held at or near the surface of the water. The ropes 70 are light at the early bivalve growth stage and the airbladders 34 in the pontoons 31 are filled with air to hold the raft 100 at or near the surface. When necessary or desired, the floats 60 and float lines 62 are attached to the raft 100 and the raft 100 is submerged as desired.

The submersion control system 40 is used to submerge the raft 100. First, at least one of the air inlet/out valves 38 that allow air to enter and exit the airbladder 34 is actuated. Water entering the pontoon 31 through at least one of the one-way valves 39 forces air out of the airbladder 34 and through the air inlet/out valve 38, which is connected to an air hose (not shown). One or more pontoons 31 are flooded with water as needed, to submerge the raft 100 to a desired depth. In the embodiment shown, the air inlet/out valves 38 are actuated by levers 33 shown in FIG. 10.

To raise a submerged raft 100 to the surface, the air hose that is connected to the air inlet/outlet valve 38 is attached to an air compressor and air is pumped into the airbladder 34, which forces water out of the pontoon 31 through the air/water outlet valves 42.

In the embodiment shown, the buoyancy support structure 30 includes three pontoons 31. The outer pontoons 31A, 31C, each have one airbag 34. The middle pontoon 31B has three airbags 34A, 34B, 34C. When newly seeded with bivalves, the raft 100 is relatively light, so, to submerge it, a significant amount of weight needs to be added to the raft. In this case, all pontoons 31 are filled with water, which forces the air out of the buoyancy support structure 30 via the valves in the control system 40 and through the air hose. When the bivalves are half grown, however, the raft 100 is heavier and less weight needs to be added. In this case, one or more of the airbags in the middle pontoon 31B are filled with air while the outer pontoons 31A and 31C are filled with water to submerge the raft surface 10 to the proper depth. When bivalves are fully grown, all three airbags 34A, 34B, 34C in the middle pontoon 31B are filled with air, and the outside pontoons 31A and 31C are filled with water. To raise the submerged raft 100, the air bags 34 are inflated.

In one embodiment, a set of air hoses (not shown) is used to provide air to the air bladders 34. One end of the air hose is connected to the air bladder 34 and the other is connected to the air hose manifold 37. Another air hose is connected to the manifold 37 and is attached to a buoy (not shown) and secured to the raft 100 by an acoustic release device 35, such as Sonardyne Oceanographic Systems acoustic release transponder shown schematically in FIG. 2. To raise the raft 100, the acoustic release device is actuated remotely by sending an acoustic signal to the device, which then releases the air hose and buoy, allowing them to rise to the surface where they are attached to an air compressor that provides air to the air bladders 34. The non-connected end of the air hose may be attached to a quick disconnect air fitting, which is attachable to an air compressor to provide air to the air hose manifold 37 and then to the air bladder 34. In another embodiment the buoy is not secured to the raft but is floating on the surface.

In another embodiment, one end of an air hose is connected to an air bladder 34, the air hose is secured to the float line 62 that connects the float 60 to the raft 100, and the non-connected end is secured to the float 60 to ensure access at the surface of the water. The non-connected end may then be attached to an air compressor to provide air to the air bladder 34.

The submersible raft 100 may operate in a passive mode. When the floats 60 are connected to the raft surface 10 the submersion control system 40 may be actuated at the surface thereby submerging the raft 100 to a desired depth. Once submerged, the buoyancy support structure 30 and the floats 60 provide enough buoyancy to support the aquatic cultures as they grow for an extended period of time. The submersible raft 100 may also operate in an active mode, whereby additional air inlet/out valves 38 are actuated and, to raise the raft to a shallower depth, air is provided to the additional air bladders 34, or to submerge the raft 100 to a greater depth air would be released from the additional air bladders 34 allowing water to enter the buoyance support structure 30.

Figure 7:
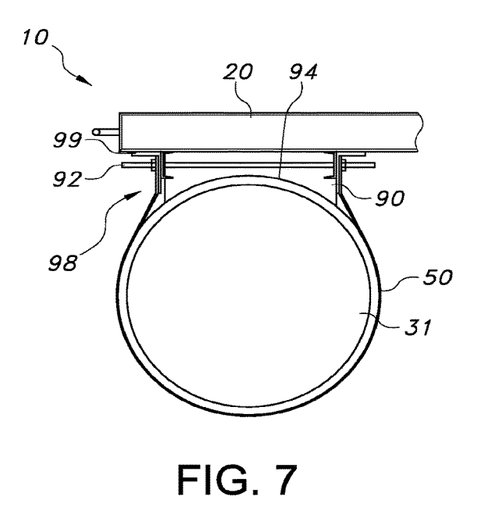
FIG. 7 is a plan elevation view, showing a saddle mounted between a pontoon and the raft surface.
Figure 8:
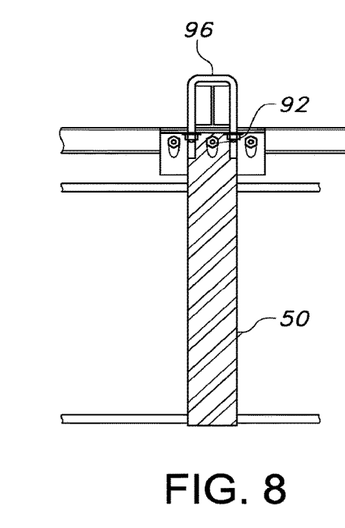
FIG. 8 illustrates a support strap and a bracket for fastening the pontoon to the raft surface.
Figure 9:
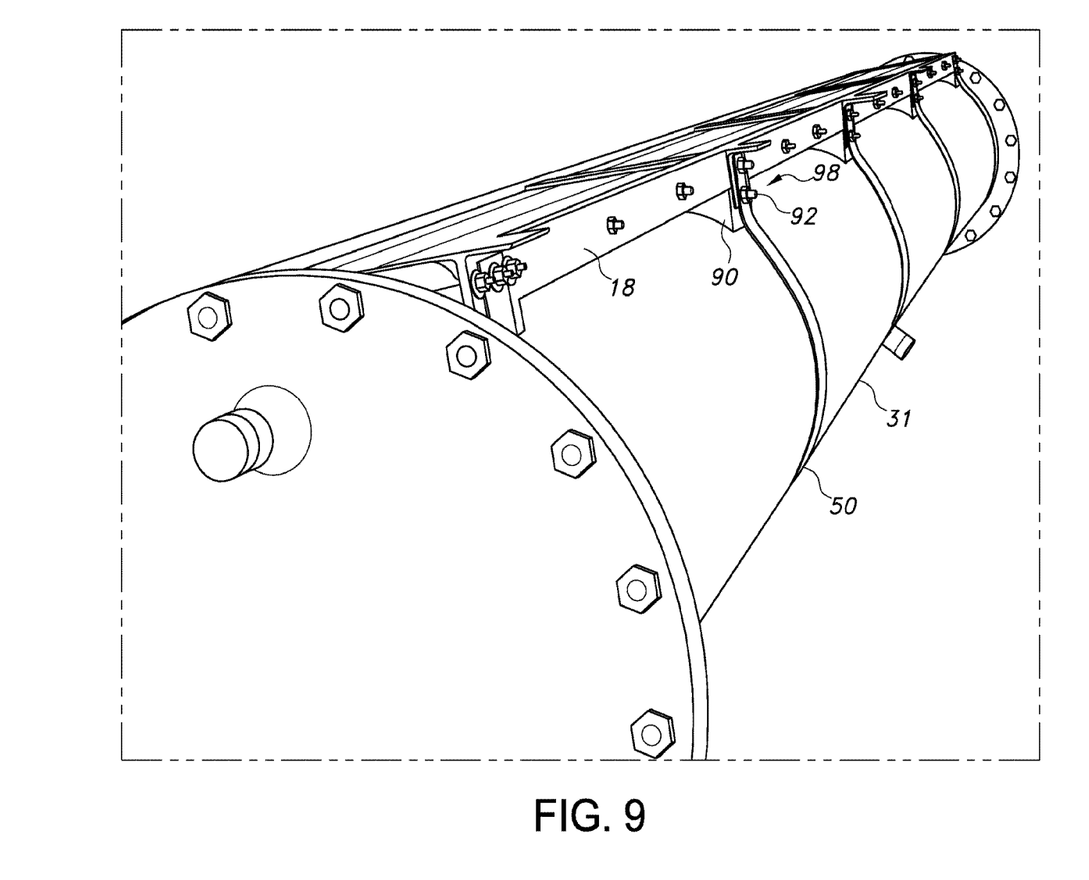
FIG. 9 is a perspective view of a pontoon, showing saddle assembles coupling the raft surface to the pontoon.

FIGS. 7, 8 and 9 illustrate the details of a saddle assembly 98 that fastens the pontoon tie 20 to the pontoon 31. The saddle assembly 98 has a saddle 90 with a through-bore through which a threaded bar 92 is inserted. A bracket 99 is affixed to the underside of the raft surface 10. Conventional fasteners, such as nuts and bolts, are used at the ends of the threaded bar 92 to fasten the ends of a support strap 50 to opposites sides of the saddle 90, as well as to fasten the bracket to the raft surface 10. An opening is provided between the saddle 90 and the pontoon 31 so that air hoses may run between them. Suitable fasteners 96, such as, for example, U-bolts, are then used to secure individual pontoon ties 20 of the raft surface 10 to the buoyancy support structure 30.

In one embodiment, the saddle 90 is welded directly to pontoon 31 for additional structural support. In another embodiment, the bottom of the saddle 90 has a neoprene pad 94 that fits against the contour of the pontoon 31, so that the strap 50 and fastener are prevented from slipping radially on the pontoon 31.

Figure 11:
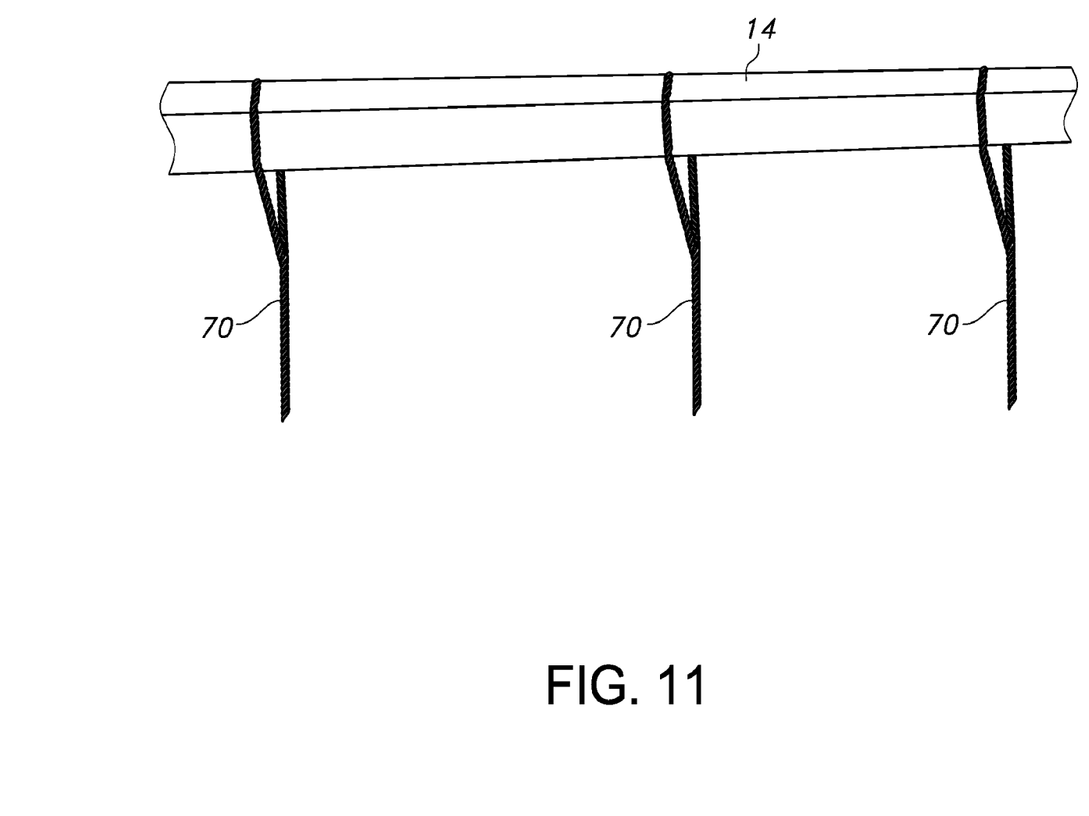
FIG. 11 is perspective view of aquatic culture ropes suspended from surface elements.

The ropes 70 are suspended from the raft surface 10, which may be constructed with surface elements, such as a plurality of planks, steel members, timbers, or with a sheet of suitable material. In the embodiment shown, the raft surface 10 is shown constructed of a plurality of surface elements fastened to the top of the pontoon ties 20 as shown in FIGS. 1, 2, 3 and 9 and the ropes 70 are suspended from the surface elements, as shown in FIG. 11. The raft surface 10, buoyancy support structure 30, submersion control system 40, saddle assembly 98, floats 60, and ropes 70 are modular components that allow for convenient transport and assembly of the raft 100.

In another embodiment, the raft surface 10 has a plurality of upper support members 14, shown in FIG. 1, that are attachable on top of the pontoon ties 20. Reinforcing bars 16, shown in FIGS. 1 and 3, that are fastenable to the pontoon ties 20 may be used to strengthen or stabilize the raft surface 10. Structural support members 18 may also be provided for additional support where the raft surface is under the most stress. The support members 20, 14, 16, 18, may be made of any suitable material. In the embodiment shown, for example, the pontoon ties 20 are steel, the upper support members 14 are timber, the reinforcing bars 16 are steel, and the structural support members 18 are steel C-channels.

It is understood that the embodiments described herein are merely illustrative of the present invention. Variations in the construction of the submersible raft may be contemplated by one skilled in the art without limiting the intended scope of the invention herein disclosed and as defined by the following claims.

What is claimed is:

1. A submersible raft for aquaculture, the raft comprising:
   a raft surface;
   a buoyancy support structure for buoyantly supporting the raft surface in a body of water;
   a submersion control system for selectively placing the raft surface at a surface level of the body of water or submerging the raft surface to a depth below the surface level;
   wherein the buoyancy support structure includes a plurality of pontoons that are secured to the raft surface by a plurality of pontoon ties;
   wherein the submersion control system includes at least one air bladder placed inside of at least one pontoon of the plurality of pontoons; and
   wherein at least one pontoon has at least one inlet/outlet valve through which an air hose with at least two ends is connectable to the air bladder on one end and to an air compressor on the other end, and an inlet valve that allows water to enter the pontoon and an outlet valve allows water to exit the pontoon.

2. The submersible raft of claim 1, wherein a plurality of aquatic culture ropes hang beneath the raft surface.

3. The submersible raft of claim 1,
   wherein the air hose is connectable to the air bladder on one end and to an air manifold on the other end; and
   Wherein the air manifold is connectable to one end of a surface air hose and the other end of the surface air hose is secured to a buoy floating on the surface.

4. The submersible raft of claim 1, wherein the outlet valve is connected to a conduit that is connected to a perforated tube extending the along the pontoon; and
   wherein, when the air bladder is inflated, water inside of the pontoon is forced into the perforated tube, through the conduit and out of the pontoon through the outlet valve.

5. The submersible raft of claim 1, further comprising two one-way outlet valves, one on each end of the pontoon, and two conduits, wherein each outlet valve is connected to one end of one of the conduit and wherein the other end of the conduit is connected to a perforated tube that extends between the two conduits;
   wherein, when the air bladder is inflated, water inside of the pontoon is forced into the perforated tube, through the conduits and out of the pontoon through the outlet valves.

6. The submersible raft of claim 1, wherein one or more holes are provided near the top of the conduit to also allow air to exit the pontoon.

7. The submersible raft of claim 1, further comprising floats that are attached by float lines to the submersible raft when it is submerged.

8. The submersible raft of claim 7 wherein structural support members having two sides are attached on one side to the raft surface and to the float lines on the other side.

9. The submersible raft of claim 1, wherein the plurality of pontoons includes three pontoons and wherein two of the pontoons each has one air bladder and a third pontoon has three air bladders.

10. The submersible raft of claim 1, wherein one or more saddle assemblies secure each one of the plurality of pontoon ties to a corresponding pontoon, the saddle assembly including a saddle and fastening devices.

11. The submersible raft of claim 10, wherein the saddle is welded to each one of the pontoons.

12. The submersible raft of claim 1, wherein the raft surface includes a plurality of pontoon ties that are connected to the plurality of pontoons and a plurality of upper support members that are connected to the lower support members.

13. The submersible raft of claim 12, wherein the pontoons form a rectangular arrangement and wherein two reinforcing bars are inserted through openings in the pontoon ties at diagonal angles to stabilize the rectangular arrangement.

* * * * *